United States Patent [19]

Steinberger

[11] Patent Number: 4,637,067

[45] Date of Patent: Jan. 13, 1987

[54] BOOTSTRAPPING CROSS-POLARIZATION CANCELER WITH A NOISE-BLANKING LIMITER

[75] Inventor: Michael L. Steinberger, Colts Neck, N.J.

[73] Assignee: AT&T Bell Laboratories, Murray Hill, N.J.

[21] Appl. No.: 749,207

[22] Filed: Jun. 27, 1985

[51] Int. Cl.$^4$ ............................................. H04B 1/10
[52] U.S. Cl. ................................... 455/295; 455/304; 455/305; 455/278; 455/63; 375/58; 375/99
[58] Field of Search ............... 455/295, 283, 60, 63, 455/278, 303, 304, 305; 375/99, 101, 58; 333/18, 28 R; 343/361

[56] References Cited

U.S. PATENT DOCUMENTS

| | | | |
|---|---|---|---|
| 3,140,445 | 7/1964 | Myers et al. | 455/224 |
| 3,699,457 | 10/1972 | Wright | 455/224 |
| 3,982,245 | 9/1976 | Soule, Jr. et al. | 343/100 |
| 4,090,137 | 5/1978 | Soma et al. | 455/63 |
| 4,220,923 | 9/1980 | Pelchat et al. | 455/63 |
| 4,283,795 | 8/1981 | Steinberger | 455/283 |
| 4,320,535 | 3/1982 | Brady et al. | 455/278 |
| 4,369,519 | 1/1983 | Yuuki et al. | 455/295 |
| 4,438,530 | 3/1984 | Steinberger | 455/278 |
| 4,479,258 | 10/1984 | Namiki | 455/295 |

OTHER PUBLICATIONS

Brandwood, Intl. Conf. on Antennas & Prop., London, England, Nov. 1978, pp. 41–45.
Bar-Ness, 1981 Intl. Symposium Antennas & Prop., Los Angeles, California, vol. 1, pp. 292–295.
Bar-Ness et al., ICC '82, Philadephia, Pa., vol. 2, pp. 4F.5.1–4F.5.5.
Kavehrad, AT&T Bell Laboratories Technical Journal, vol. 63, No. 3, Mar. 1984, pp. 499–521.
W. Poel, Radio and Electron. World (GB), Oct. 1983, pp. 19–23.

*Primary Examiner*—Jin F. Ng
*Assistant Examiner*—Elissa Seidenglanz
*Attorney, Agent, or Firm*—Erwin W. Pfeifle

[57] ABSTRACT

The present invention relates to a bootstrapping cross-polarization canceler which includes a noise-blanking limiter in the path before a correlation detector, and a processor which uses the output from the correlation detector to provide cross-polarization cancellation continuously or just during an outage condition where orthogonally received signals from a communication path include error rates which exceed a predetermined threshold. Alternatively, the processor can use the output of a pseudo error detection, which detects the error rate of the orthogonally received signals, when the error rates in the received signals are below the predetermined threshold in order to achieve convergence and cross-polarization cancellation in the canceler during a non-outage period.

7 Claims, 11 Drawing Figures

BOOTSTRAPPING CROSS-POLARIZATION CANCELER WITH A NOISE-BLANKING LIMITER

TECHNICAL FIELD

The present invention relates to a bootstrapping cross-polarization canceler and, more particularly, to a bootstrapping cross-polarization canceler which comprises a noise blanking limiter in at least one of two feedback paths associated with the two rails propagating orthogonally polarized signals with possible cross-polarization components, correlation detection means in each feedback path, a processing means which can provide for continuous bootstrapping operation or bootstrapping operation only when a detected bit error rate in remote receivers is above a predetermined threshold level indicative of an outage condition, and adjusting means in cross-over paths between the two rails which is responsive to control signals from the processing means for converging the canceler.

Description of the Prior Art

Channel capacity of a telecommunication system is doubled by transmitting independent signals within the same frequency band in orthogonal polarizations. Isolation between signals of these orthogonal polarizations is diminished by atmospheric and other effects such as rain depolarization, Faraday rotation in the ionosphere, and imperfect antenna alignment. Reduction of the isolation between orthogonally polarized signals increases cross-coupling between the polarized signals and can seriously degrade service quality in telecommunication systems.

Cross-polarization interference cancellation arrangements have been proposed as a suitable means of reducing interference caused by coupling between cross-polarized signals. See, for example, the cross-polarization cancelers described in U.S. Pat. Nos. 4,283,795 and 4,438,530 issued to M. L. Steinberger on Aug. 11, 1981, and Mar. 20, 1984, respectively, and the articles "Cross-Coupled Boot-Strapped Interference Canceler" by Y. Bar-Ness in *AP-S International Symposium*, 1981, Los Angeles, Calif., Vol. 1, pages 292-295, and "Bootstrapping Adaptive Cross Pol Cancelers For Satellite Communications" by Y. Bar-Ness et al, in *ICC'82*, Philadelphia, Pa., Vol. 2, pages 4F.5.1-4F.5.5. Cancelers for cross-polarized, M-ary QAM signals have also been disclosed in, for example, the article "Performance of Cross-Polarized M-ry QAM Signals Over Nondispersive Fading Channels" by M. Kavehrad in AT&T *Bell Laboratories Technical Journal*, Vol. 63, No. 3, March 1984 at pages 499-521.

If one considers a system including, for example, a separate receiver with a demodulator for each cross-polarized signal, and a cross-polarization canceler, it appears that the cross-polarization canceler is quite capable of delaying an onset of an outage in almost every event. However, the cross-polarization canceler does not help hasten a system's recovery from an outage. Primarily, when a system is in an outage condition, the demodulator has lost lock in the carrier and clock recovery circuits. Under these conditions, the cross-polarization canceler has lost the pertinent signal in its feedback path and cannot provide further cross-polarization cancellation. Thus when the demodulator attempts to re-acquire the carrier and clock, it must do so in the presence of a substantial amount of cross-polarization interference. This naturally delays the reacquisition of the carrier and clock, and the resumption of normal operation. The problem in the prior art, therefore, is to provide an arrangement which permits the canceler to perform without a feedback signal from the demodulator.

SUMMARY OF THE INVENTION

The foregoing problem in the prior art has been solved in accordance with the present invention which relates to a bootstrapping cross-polarization canceler which comprises a noise-blanking limiter in at least one of two feedback paths associated with the two rails propagating orthogonally polarized signals with possible cross-polarization components, correlation detection means in each feedback path, a processing means which can provide for continuous bootstrapping operation or bootstrapping operation only when a detected bit error rate in remote receivers is above a predetermined threshold level indicative of an outage condition, and adjusting means in cross-over paths between the two rails which is responsive to control signals from the processing means for converging the canceler.

It is an aspect of the present invention to provide a bootstrapping cross-polarization canceler which includes correlation detecting means and a digital signal processing means. The digital signal processing means is capable of detecting both the correlation measurements from the correlation detecting means and bit error rates from a pseudo error detecting means in associated remote receivers, and using the error rate signals for converging the canceler when the bit error rate is below a predetermined threshold level, and the correlation measurements for converging the canceler when the bit error rate is equal to or above the predetermined threshold.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
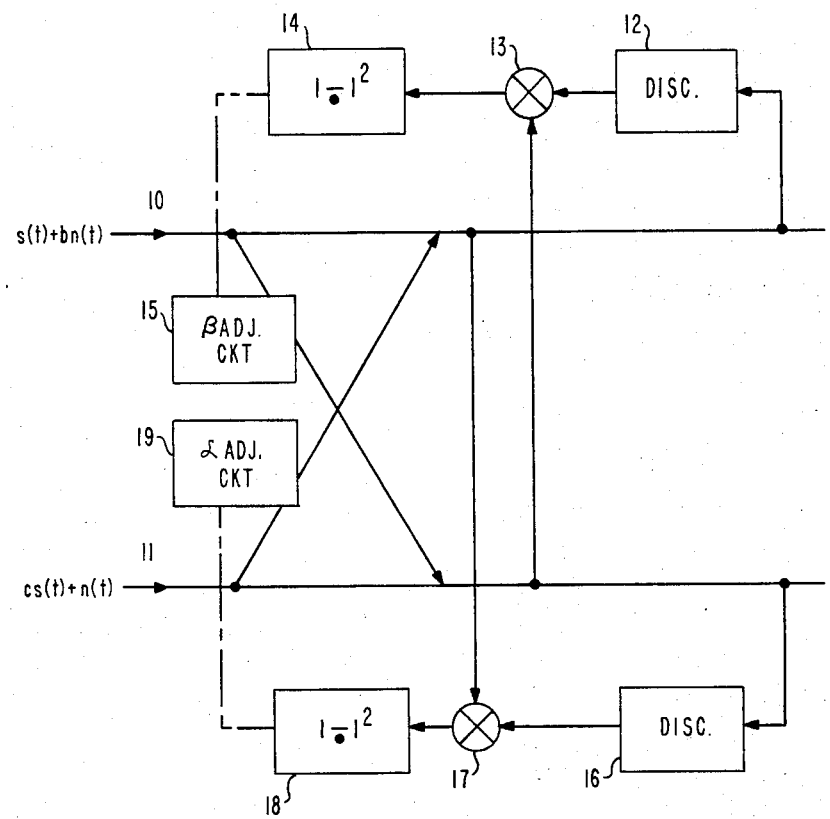
FIG. 1 is a block diagram of a bootstrapping cross-polarization canceler found in the prior art.

FIG. 1 illustrates a configuration for a prior art bootstrapping interference canceler which entitled "Bootstrapping Adaptive Cross Pol Cancelers For Satellite Communications" in *ICC'82*, Philadelphia, Pa., at pages 4F.5.1–4F.5.5. In this particular configuration, two cross-coupled interference cancellation loops each use a measure of the correlation between the two output signals as their source of feedback information.

In FIG. 1, the input to one rail 10 of the canceler will be designated s(t)+bn(t) comprising a first one of two orthogonally polarized signals, designated "s", with some interference from a second one of the two orthogonally polarized signals designated "n". The input on the other rail 11 is designated cs(t)+n(t) comprising the second one of the two orthogonally polarized signals, "n", with some interference from the first one of the two orthogonally polarized signals, "s". In the above designations, s(t) and n(t) are the first and second orthogonally polarized complex signals to be separated, and b and c are the complex depolarization coefficients.

In the known canceler of FIG. 1, the goal is to adjust a complex cancellation coefficient $\alpha$ so as to obtain an interference-free version of the first signal "s", and to vary a cancellation coefficient $\beta$ so as to obtain an interference-free version of the second signal "n". This is accomplished by taking a sample of the first signal on rail 10 and sending it through a discriminator 12 to provide an output signal representative of the discrimination between the first signal s(t) and the interference bn(t), which output signal is correlated in correlator 13 with the signal cs(t)+n(t) found on rail 11 and the result of such correlation is then provided as an input to, for example, a power detector 14. Correlator 13 generally functions to measure the in-phase and quadrature components of the correlation between the signals from discriminator 12 and the signal from rail 11. Power detector 14 takes the result of this correlation and generates an output control signal which is used to appropriately adjust the cancellation coefficient $\beta$ in circuitry 15 in a cross-over path from rail 10 to rail 11 to introduce a signal into rail 11 which cancels, or substantially reduces, the value of the interference cs(t) in the signal on rail 11. An example of the above-described arrangement for elements 12–15 is shown and described in U.S. Pat. No. 4,283,795 issued to M. L. Steinberger on Aug. 11, 1981. A similar arrangement, including a discriminator 16, a correlator 17, and a power detector 18, is used with rail 11 to appropriately adjust the cancellation coefficient $\alpha$ in circuitry 19 in a cross-over path from rail 11 to rail 10 to introduce a signal into rail 10 which cancels, or substantially reduces, the value of the interference bn(t) in the signal on rail 10.

In the absence of the discriminator 12 or 16, the two correlation measurements provided in correlators 13 and 17 would be the same, and the interference canceler could not possibly converge for both directions of cancellation. The purpose of discriminators 12 and 16, again, is to provide discrimination between the signal and the interference on the appropriate output signal so that the corresponding correlation measurement is more sensitive to the interference than it is to the signal. When the discrimination function is present, then at least one cancellation loop can converge toward the desired cancellation. As the one cancellation loop converges, it provides a cleaner sample of interference to the other cancellation loop. With this cleaner sample of interference, the second cancellation loop can converge towards its desired cancellation, providing a cleaner sample of interference to the first cancellation loop. This allows the first cancellation loop to converge further, and the process is continued until complete interference cancellation has been obtained in both directions. The advantage of the bootstrapping configuration is that neither correlation measurement need be completely sensitive to the corresponding interference and completely insensitive to the signal. Instead, all that is required is that there be a discrimination method which is somewhat more sensitive to the appropriate interference than it is to the corresponding signal.

Figure 2:
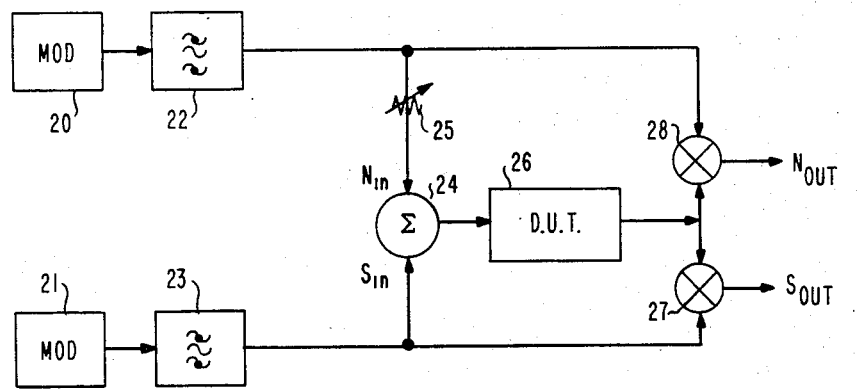
FIG. 2 is a block diagram of a simulation circuit as found in the prior art for testing responses of limiters.

In the article "Cross-Coupled Cancellation System For Improving Cross-Polarisation Discrimination" by D. H. Brandwood in *International Conf. on Antennas & Propagation*, London, Nov. 1978 at pages 41–45, an arrangement similar to that shown in FIG. 1 is disclosed. In the adaptive cancellation system in FIG. 2 of the article, it is suggested that limiters be used in the phase reference side of the correlators. A similar suggestion was made in the Bar-Ness et al article, parts of which will be summarized hereinafter for purposes of background understanding of the present invention. The Bar-Ness et al. article discloses a limiter simulation circuit which introduces two QPSK signals having slightly different baud rates as the two source signals. This limiter simulation circuit is shown in present FIG. 2 for completeness of discussion. In FIG. 2, the two modulators 20 and 21 are asynchronous in both clock and carrier phase. The output from each of modulators 20 and 21 is transmitted through a separate filter 22 and 23, respectively. In a summation junction 24, a small but variable amount of signal N, as obtained from filter 22 through a variable attenuating means 25, was added to signal S, as obtained from filter 23, and the resultant signal passed through a limiter or some other device under test (DUT) 26. The output from a limiter 26 was then correlated in correlators 27 and 28 with the signal S and the signal N, respectively, to obtain the associated output signals. From the Bar-Ness et al article, it was shown that the inclusion of a limiter provided small signal suppression.

Figure 3:
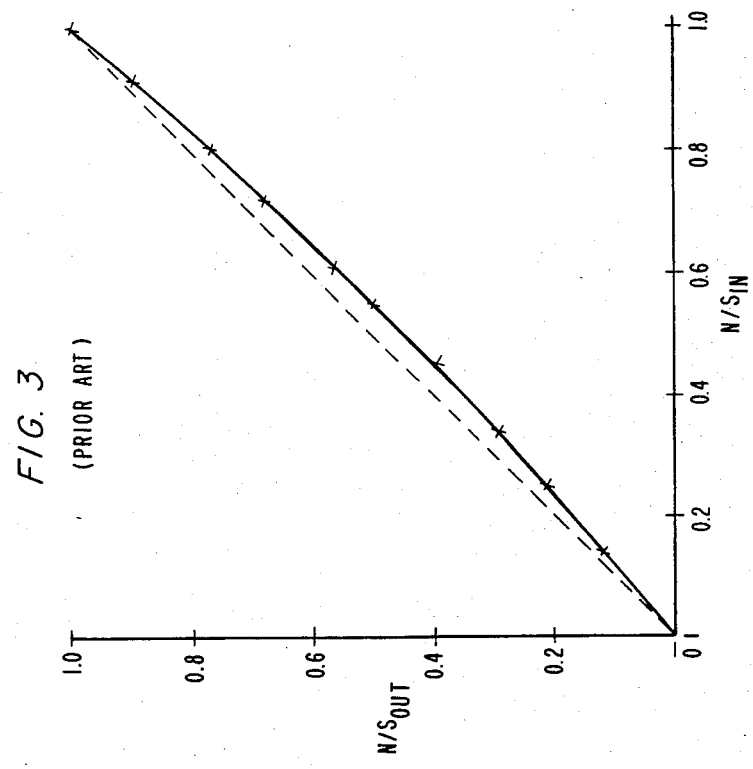
FIG. 3 are curves of the ratio of two signals at the input −s. output of (a) a path with no distortion and (b) an ideal limiter in the arrangement of FIG. 2 vs. the ratio of the two signals at the output of the limiter.

If two 64 QAM source signals are substituted for the two QPSK source signals provided by modulators 20 and 21 in the limiter simulation circuit of FIG. 2, and first a path which introduces no distortion is substituted as the (DUT) 26 and a first test run is made, and then an ideal limiter is introduced for the DUT 26 and another corresponding test is run, the results shown in FIG. 3 would be obtained. In FIG. 3, the dashed line represents the resultant curve for the ratio N/S of the signals at the input vs. the N/S ratio of the signals at the output in the arrangement of FIG. 2 as found for an undistorted path being used for the limiter, while the solid line represents the resultant curve of the corresponding ratios when an ideal limiter is used as DUT 26. From FIG. 3, it can be seen that the ideal limiter provides a slight amount of signal suppression, which agrees with the results of the Bar-Ness et al article. More particularly, when the interference is a nearly constant envelope, then the ideal limiter can be expected to display a small signal suppression. However, when the interference has large amplitude fluctuations, the small signal suppression is very slight.

If one considers only those times at which the input envelope to the limiter in FIG. 2 is above a given threshold, where presumably the desired signal is greater than both the threshold and the small undesired signal, it should result in greater suppression of the smaller signal. Using the limiter arrangement shown in FIG. 4, e.g., an ECL Schmitt-trigger circuit having the $P_{IN}$ vs. $P_{OUT}$ characteristics shown in FIG. 4, for the limiter or DUT 26 in the simulation circuit of FIG. 2, the results obtained are shown in FIG. 5. As shown in FIG. 5, it was found that such limiter arrangement actually enhances the effect of the small signal, rather than suppressing it.

Figure 4:
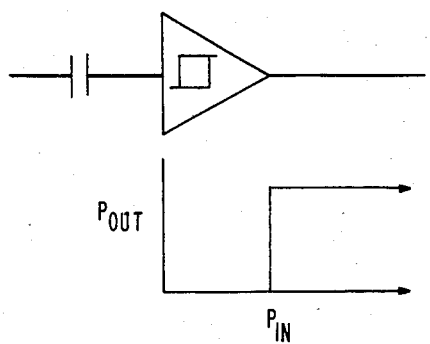
FIG. 4 illustrates a known limiter diagram and its $P_{IN}$ vs. $P_{OUT}$ characteristics.
Figure 5:
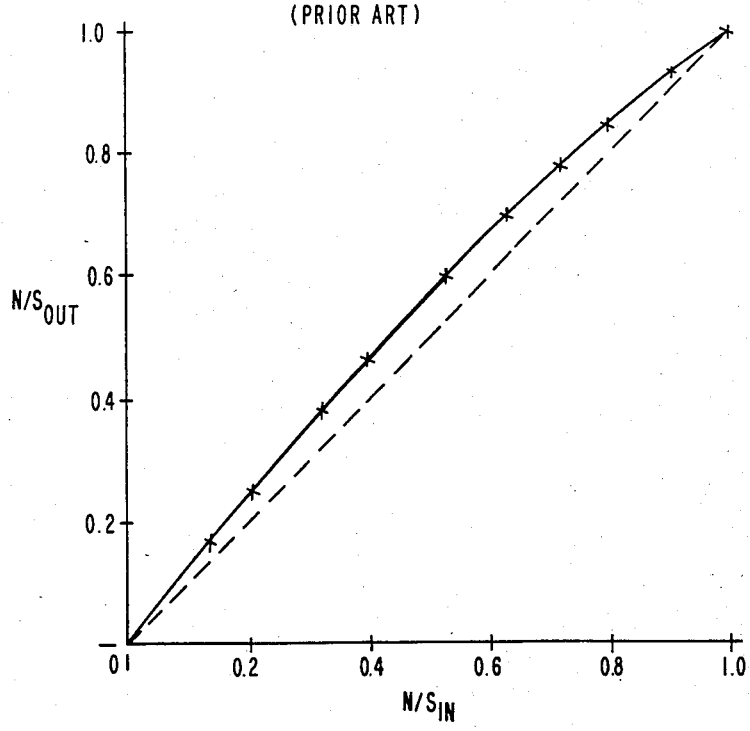
FIG. 5 illustrates curves similar to that of FIG. 3 for the limiter of FIG. 4 in the arrangement of FIG. 2.
Figure 6:
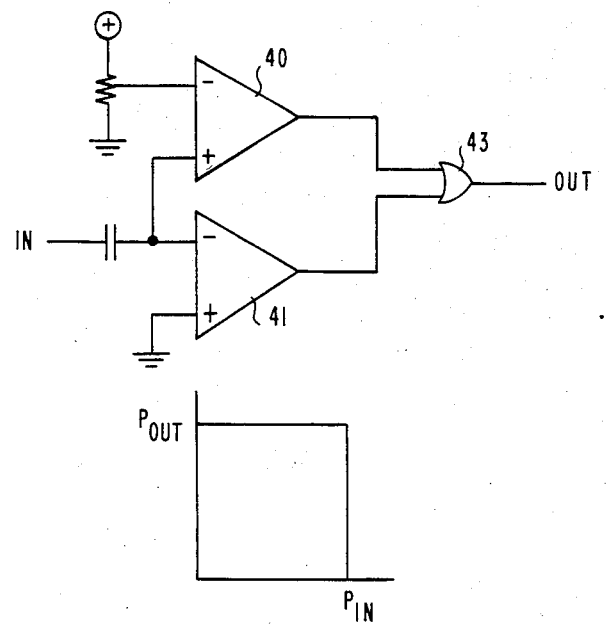
FIG. 6 shows a circuit diagram of a novel noise blanking limiter and its associated $P_{IN}$ vs. $P_{OUT}$ characteristics for use in the canceler of the present invention.
Figure 7:
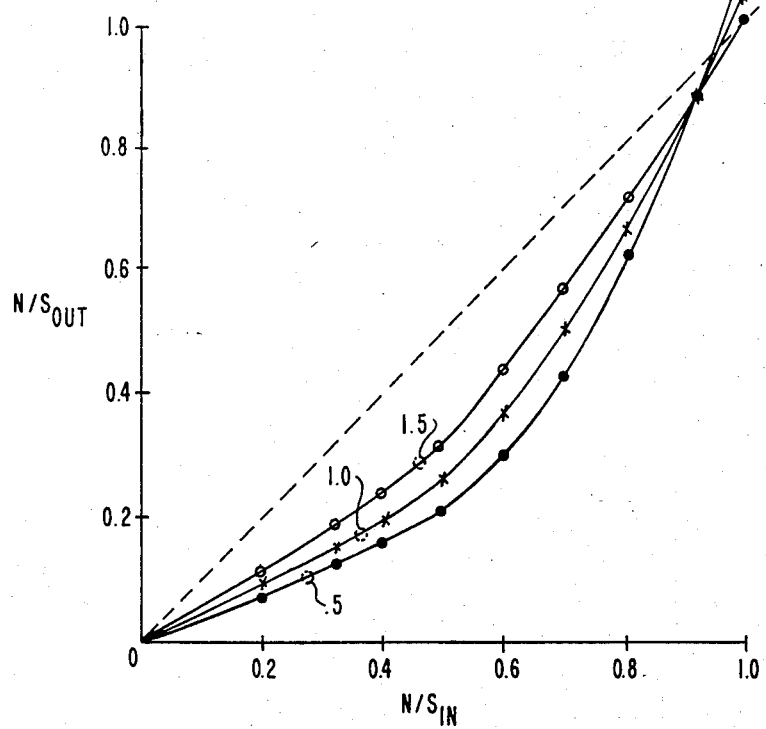
FIG. 7 illustrates a set of curves similar to that of FIG. 3 for the limiter of FIG. 6.

In accordance with the present invention, this problem is overcome by the use of a novel noise-blanking limiter of the type shown in FIG. 6 having the $P_{IN}$ vs. $P_{OUT}$ characteristic shown in FIG. 6 rather than the characteristic of the limiter of FIG. 4. This limiter comprises two ECL comparators 40 and 41, where each comparator can comprise an operational amplifier including "+" and a "−" input terminals and an output terminal. The input signal to this limiter is applied to the "+" and "−" terminals of comparators 40 and 41, respectively, via a capacitor 42. The other input terminal of each of comparators 40 and 41 has applied thereto a separate threshold voltage for purposes of comparison. The output terminal of comparators 40 and 41 are each applied to a separate input terminal of an OR gate 43. The results obtained with the limiter of FIG. 6, when tested as the DUT in the arrangement of FIG. 2, is shown in FIG. 7. As seen in FIG. 7, different small signal suppressions are found over a wide range of thresholds.

Noise-blankers are well known. In this regard see, for example, U.S. Pat. No. 140,445 issued to R. T. Myers et al in July 7, 1964; and U.S. Pat. No. 3,699,457 issued to L. R. Wright on Oct. 17, 1972. Noise blankers are generally used to suppress interference which has a high amplitude, but small duty cycle, such as ignition, impulse, or power line noise. With input cross-polarization signals, however, the interference has essentially (a) a one hundred percent duty cycle, and (b) a small amplitude which almost never exceeds the amplitude of the desired signal. Therefore, with such signal, the application of a noise blanking limiter, as applied in the prior art, would have no effect whatsoever on such cross-polarized signals.

Figure 8:
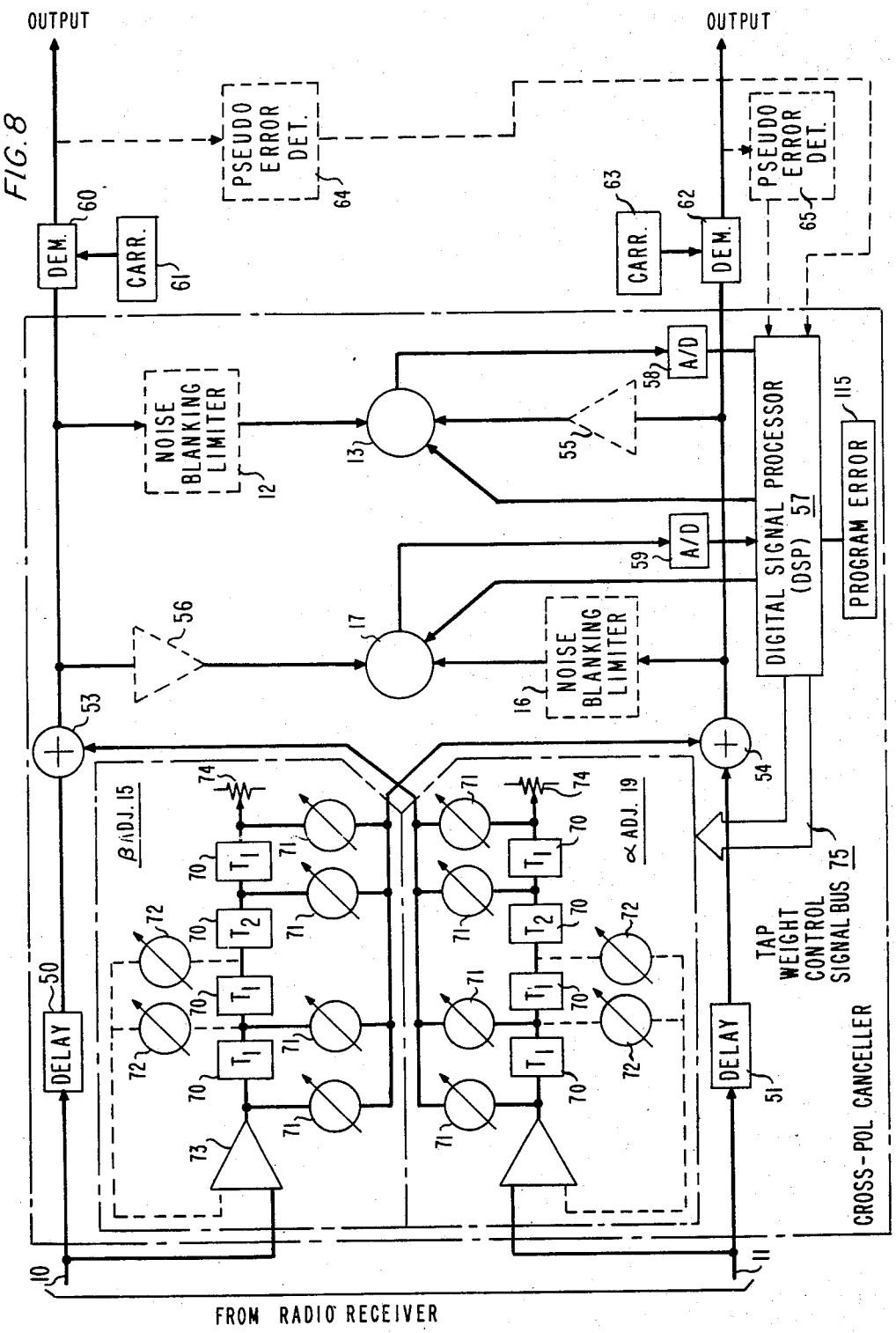
FIG. 8 illustrates a block diagram of a bootstrapping cross-polarization canceler in accordance with the present invention.

FIG. 8 is a block diagram of a bootstrapping cross-polarization canceler in accordance with the present invention which includes a noise-blanking limiter for use as a discriminator and a correlation means to provide interference suppression. The numbering of the elements of FIG. 8 have been related to each of the numbers of the elements of FIG. 1, where possible when a corresponding function exists, to provide an ease of understanding similar parts of the present cross-polarization canceler.

In FIG. 8, the input signal on rail 10 is connected to a delay line 50 and a β adjust circuit 15 in the cross-over path between rail 10 and rail 11. Similarly, the input signal on rail 11 is connected to a delay line 51 and an α adjust circuit 19 in the crossover path between rail 11 and rail 10. Delay lines 50 and 51 function to match the delay times encountered in adjusting circuits 19 and 15, respectively. The outputs from delay line 50 and α adjust circuit 19 are added in an adder 53, which can comprise a summing amplifier. The result of adding these two input signals in adder 53 is to provide an output signal from adder 53 with a reduced cross-polarization component "bn(t)" on rail 10. Similarly, the outputs from delay line 51 and β adjust circuit 15 are added in an adder 54 to provide an output signal from adder 54 with a reduced cross-polarization component "cs(t)" on rail 11.

The output from adder 53 is the output signal on rail 10 from the canceler and is also applied to a noise blanking limiter 12, of the type shown in FIG. 6, which functions as the discriminator 12 in the arrangement of FIG. 1. The output from noise blanking limiter 12 is correlated in correlation detector means 13 with the output signal on rail 11, which can be amplified in an optional buffer amplifier 55. The output from correlation detector means 13 is then applied to a digital signal processor (DSP) means 57 via, for example, an analog-to-digital (A/D) converter 58. Similarly, the output from adder 54 is the output signal on rail 11 from the canceler and is also applied to a noise blanking limiter 16, of the type shown in FIG. 6, which functions as the discriminator 16 in the arrangement of FIG. 1. The output from noise blanking limiter 16 is correlated in correlation detector means 17 with the output signal on rail 10, which can be amplified in optional buffer amplifier 56. Noise blanking limiter 16 is shown with dashed lines to signify that only one of either one of noise blanking limiters 12 and 16 is actually required, since the present cross-polarization canceler will operate with only one noise-blanking limiter, but not as well as with both noise blanking limiters which is the preferred embodiment. The output of correlation detector means 17 is then applied to DSP means 57 via an A/D converter 59. DSP means 57 functions, in accordance with steps stored in an associated EPROM 115, as both the power detecting means 14 and 18 in the arrangement of FIG. 1 to provide appropriate control signals to adjusting circuits 15 and 19 for converging the present cross-polarization canceler.

The output from the present cross-polarization canceler on rails 10 and 11 are then applied to a receiver terminal which appropriately demodulates the converged output signal "s(t)" on rail 10 in a demodulator 60 using a predetermined carrier frequency generated by a carrier signal means 61, and demodulates the converged output signal "n(t)" on rail 11 in a demodulator 62 using a predetermined carrier frequency generated by a carrier signal means 61. The output signals from demodulators 60 and 62 can be applied to optional pseudo error detector means 64 and 65, respectively, which function to determined the error rate in each output signal. If such detector means are used, the output signal from detector means 64 and 65, indicating the bit error rate in the output signals on rails 10 and 11, respectively, can be applied as separate inputs to DSP means 57. Such error rate control signals can be then used by DSP means 57 to determine if such error rate is below or above a predetermined threshold level. If the error rate is below the threshold level, then DSP means 57 can use the control signals from detector means 64 and 65 in aiding in the converging of the canceler by monitoring if the bit error rate is increasing or decreasing. If, however, the error rate is above the threshold level, indicating, for example, an outage or trouble condition, DSP means 57 can be arranged to not use the output signals from detector means 64 and 65 in aiding the converging process of the canceler, for reasons stated previously, and in turn use the correlation measurements of correlation detector means 13 and 17.

In FIG. 8, α and β adjusting means 19 and 15 are shown using a typical arrangement which is for purposes of explanation only and not for purposes of limitation since other and different circuitry can be used to obtain similar results. More particularly, each of adjusting means 15 and 19 are shown as including a tapped delay line with four delay sections 70, four transversal taps with weighting circuits 71, two optional recursive taps with weighting circuits 72, a summing amplifier 73, and a matching arrangement 74. Each of the optional recursive tap weighting circuit 72 outputs are combined and added to the input signal on the associated rail in summing amplifier 73 to provide a resultant output signal which is provided to the input of the delay line comprising delay sections 70. The outputs from the weighting circuits 71 associated with the transversal taps are added together and added to the input signal of the other rail in associated added 53 or 54. Each of the weighting circuits 71 and 72 apply a separate predetermined weighting coefficient which is determined by DSP means 57 and transmitted to weighting circuits 71 and 72 via control signals on a tap weight control signal bus 75.

Figure 9:
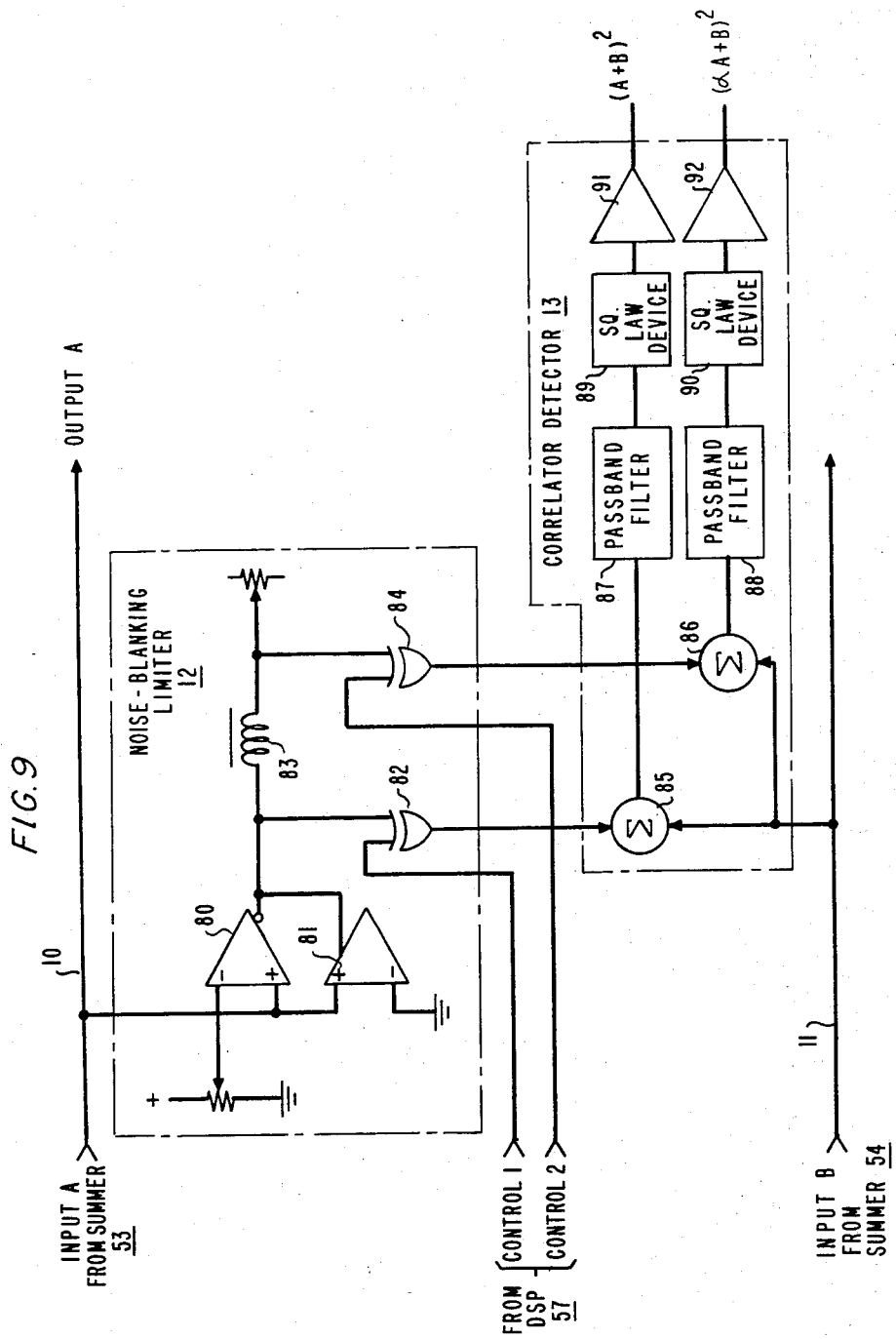
FIG. 9 illustrates a diagram of a correlation detecting means for use in the canceler of FIG. 8.

FIG. 9 illustrates a block diagram of a typical noise-blanking limiter and correlation detector means for use in the canceler of FIG. 8. It is to be understood that the arrangement of FIG. 9 applies to the combination of either one of noise-blanking limiter 12 and correlator detector means 13 or noise-blanking limiter 16 and correlation detector means 17, since both combinations comprise the same arrangement. However, the discussion hereinafter of the arrangement of FIG. 9 will be directed only toward the combination of noise-blanking limiter 12 and correlation detector means 13.

In FIG. 9, the input signal on rail 10, designated input A, propagates along rail 10 to the output and is also applied to noise-blanking limiter 12. Noise-blanking limiter 12 as shown in FIG. 9 is an equivalent circuit to that shown in FIG. 6 and comprises a first and second operational amplifier (OP-AMP) 80 and 81 with the input signal on rail 10 being applied to the "+" input terminal of each OP-AMP and a separate threshold level being applied to each "−" input terminal. The output of OP-AMP 80 is inverted and added to the non-inverted output from OP-AMP 81 and the resultant signal is concurrently applied to one input of a first exclusive-OR (EX-OR) gate 82 and through a delay circuit 83 to one input of a second EX-OR gate 84. For purposes of discussion, it will be assumed that the input to EX-OR gate 84 is phase shifted by approximately 90 degrees from the input to EX-OR gate 82 by delay circuit 83.

EX-OR gates 82 and 84 are used to multiply the output of noise-blanking limiter 12 by a "+1" or a "−1", under control of the input control signals designated Control 1 and Control 2 from DSP 57. Each of the outputs from EX-OR gates 82 and 84 are added to the signal propagating on rail 11, designated signal B, in summing junctions 85 and 86, respectively, which form part of correlator detector means 13. The outputs of summing junctions 85 and 86 are, therefore, B±A and B±jA, respectively. The outputs from summing junctions 85 and 86 are then passed through a first and second passband filter 87 and 88, respectively, and then into respective square law devices 89 and 90. The passband filters 87 and 88 are used to remove higher frequency products from the output of the noise-blanking limiter 12 which would otherwise cause a DC offset in the square law devices 89 and 90. The outputs from square law devices 89 and 90 can be optionally conditioned by OPAMP circuits 91 and 92, respectively. The square law devices can comprise any suitable circuit as, for example, a differential pair of transistors arranged in a current-mirror configuration with the nonlinear element being the base-emitter junction of the input transistor which is biased to a quiescent current. The resultant combination of signals A and B at the output of correlator detector means 13 are shown in FIG. 9 and are then sent to A/D converter 58 as shown in FIG. 8.

Figure 10:
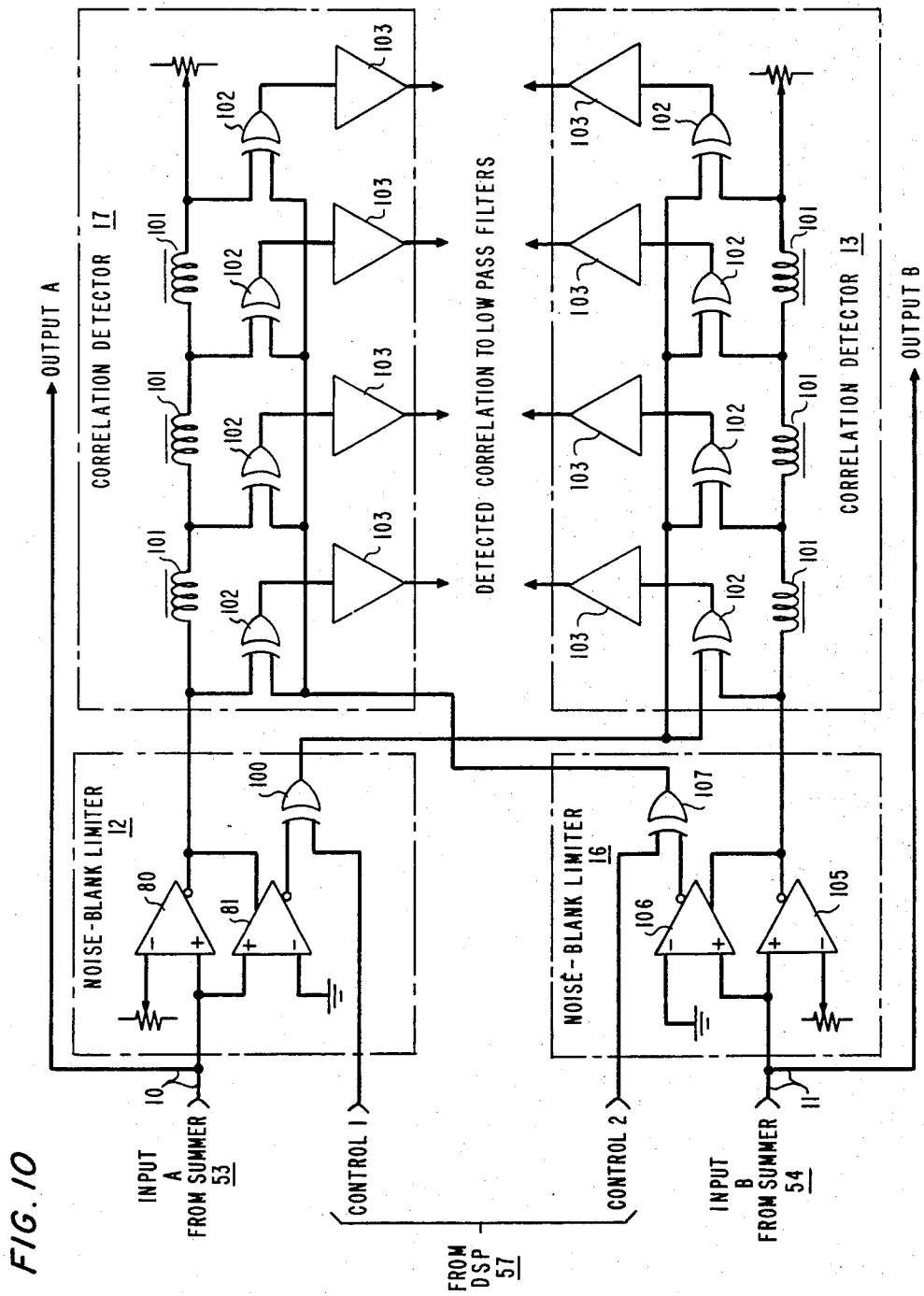
FIG. 10 illustrates a diagram of another correlation detecting means for use in the canceler of FIG. 8.

To have the bootstrapping mode, however, in order to provide a convergence which is close to the capabilities of the cancellation network, it is preferred the correlation detector measure the correlation at the same number of relative delays as found in the cancellation network of adjusting means 15 or 19. An exemplary approach is shown in FIG. 10 where both noise-blanking limiters 12 and 16 are shown with the correlation detecting portion of correlator detecting means 13 and 17. More particularly, noise blanking limiter 12 and 16 each comprise OP-AMPs 80 and 81 connected as shown for limiter in FIG. 9. Two outputs are obtained from this OP-AMP combination. The first output is the combination of the inverted output of OP-AMP 80 and the normal output of OP-AMP 81, as provided in the arrangement of FIG. 9, and the second output is an inverted output of OP-AMP 81 which is connected to one input of an EX-OR gate 100, the output of which acts as a true limiter. A similar arrangement is provided for noise blanking limiter 16 comprising OP-AMPs 105 and 106 and EX-OR gate 107.

The first output from noise blanking limiter 12 is provided to correlation detector means 17 where it is propagated through a tapped delay line portion thereof comprising separate predetermined delays 101. Each tap provides a first input to a separate EX-OR gate 102 with the second input to each gate being provided from the second output from noise-blanking limiter 16 which is the limited signal B on rail 11. It is to be understood that an EX-OR gate can not only multiply a digital signal by "+1" or "−1", as found in gates 100 and 107, but can also perform a mixing, or multiplication, function on two digital signals as found in gates 102. Therefore, EX-OR gates 102 function to perform the correlation of one signal with the output of a noise blanking limiter. Additional EX-OR gates can be used to obtain both a correlation and its complement, so that the zero point of the correlation detector means could be removed. OP-AMP circuits 103 may also be required to condition the measured correlation for input to A/D converter 58 or 59 via a low-pass filter.

A similar arrangement of delays 101, EX-OR gates 102 and OP-AMPs 103 is provided in a corresponding portion of correlation detector means 13. It is to be understood that the number of taps formed by delays 101 are preferably the same number as the number of taps found in either one of adjusting means 15 and 19. Each of the delays 101 has a same or different delay from that of the other delays 101 to provide predetermined correlation measurements at different offsets in time. In this manner the increased number of taps provide the added measurement points which improve the acquisition performance of the present canceler.

Figure 11:
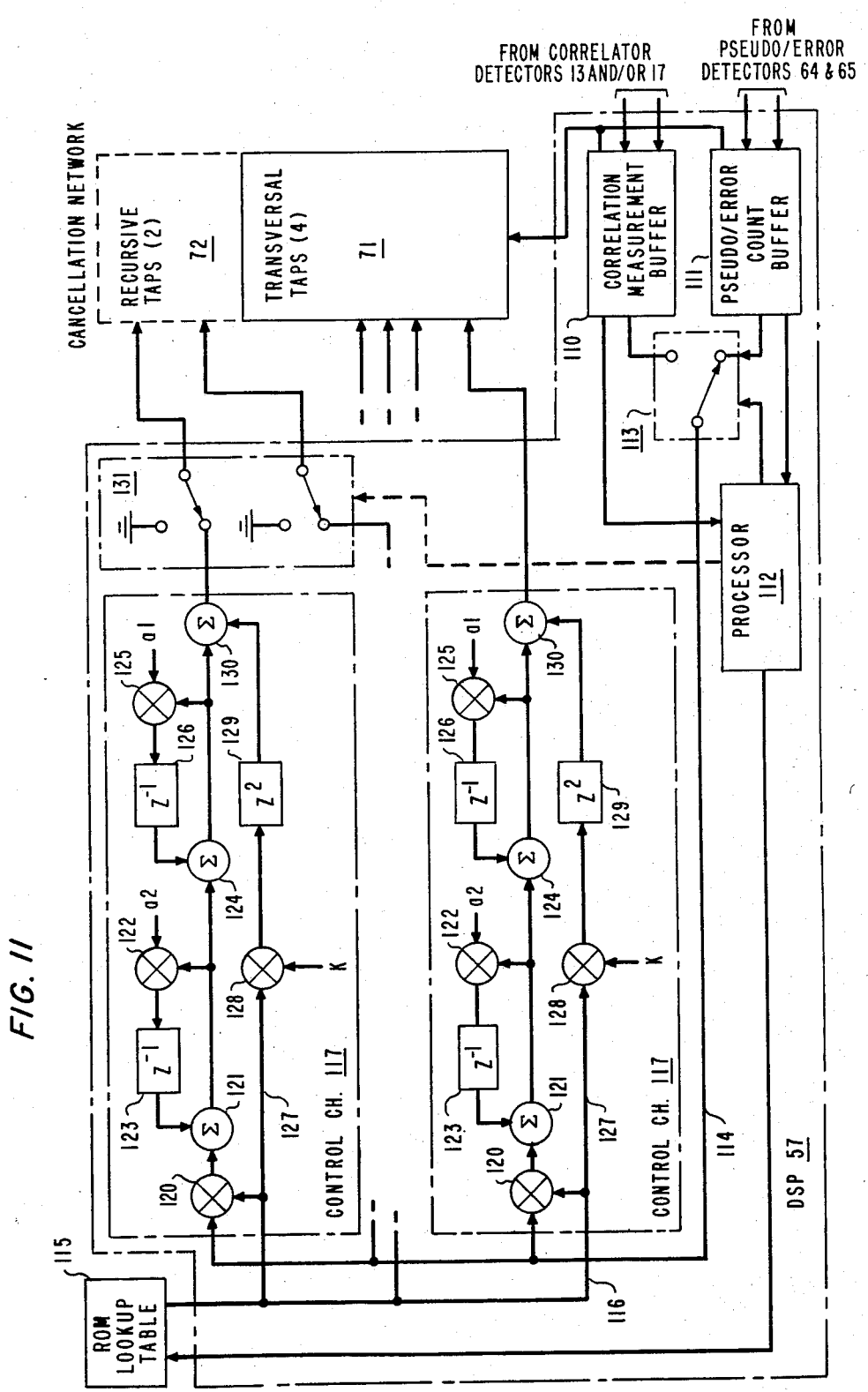
FIG. 11 illustrates a block diagram of a typical digital signal processor for use in the canceler of FIG. 8.

FIG. 11 is a block diagram of an exemplary arrangement of DSP 57 of FIG. 8. The control algorithm used is somewhat similar to that used in the interference canceler of U.S. Pat. No. 4,320,535 issued to D. M.

Brady et al on Mar. 16, 1982. As was stated hereinbefore, prior art cross-polarization cancelers had severe difficulties when the digital terminal lost the carrier and/or clock. If either the carrier or clock were lost, then the error indications from the pseudo error detector 64 or 65 no longer had any meaning and the cross-polarization canceler was without a desirable feedback signal. In the absence of cross-polarization cancellation, the cross-polarization interference prevented the digital terminal from re-acquiring carrier and clock in a timely manner. This problem can be solved with the present cross-polarization canceler by providing an optional primary source of feedback to DSP 57 from optional pseudo error detectors 64 and 65, and a secondary source of feedback to DSP 57 from correlator detector means 13 and/or 17, which is the primary source when feedback from detectors 64 and 65 is not present or usable. It is to be understood that the discussion of FIG. 11 hereinafter assumes the use of pseudo error detectors 64 and 65. However, it is to be understood that such feedback from detectors 64 and 65 is a supplementary feature of the present invention since the present novel canceler arrangement is capable of continuous operation using only the feedback from correlator detector means 13 and 17.

With this in mind, as shown in FIG. 11, the control signals corresponding to the correlation measurements from correlation detector means 13 and 17 are received and temporarily stored in a buffer 110, while the control signals corresponding to the error count from optional pseudo error detectors 64 and 65 are temporarily stored in a buffer 111. A processor 112, which can comprise any suitable processing means such as a microprocessor or hard-wired circuit, can function to compare the pseudo error count control signals stored in buffer 111 with a predetermined threshold level and determine if an outage condition exists. If no outage condition exists, processor 112 places a switch 113 in a position to output the pseudo error count control signal onto lead 114 to each control channel 117. If an outage condition exists, then processor 112 positions switch 113 to provide the correlation measurement control signal stored in buffer 110 as an output on lead 114 to each control channel 117. Processor 112 also addresses an associated Read-Only-Memory (ROM) 115 to obtain a predetermined dither signal corresponding to the error count or correlation measurement which is transmitted along lead 116 to each control channel 117.

A separate control channel 117 is provided for each of the transversal taps 71 and the optional recursive taps 71 in each of adjusting means 15 and 19. Each control channel is shown as including a multiplier 120 which multiplies the feedback control signal on lead 114 with the dither signal from ROM 115 on lead 116. The output signal from multiplier 120 is then filtered by two single pole low pass filtering means. The first filtering means comprises a summing circuit 121 which adds the output signal from multiplier 120 with a feedback signal obtained by multiplying the output from summer 121 in a multiplier 122 with a first constant "a2" and then delaying the resultant signal by one sample signal period in a delay-by-1 circuit 123. The second filtering means is in series with the first filtering means and comprises a similar arrangement of a summing circuit 124 for summing the output from summer 121 with a feedback signal obtained by multiplying the output from summer 124 with a second constant "a1" in multiplier 125 and delaying the resultant signal by one sample period in a delay-by-one circuit 126. Essentially, one filter is an integrator to provide the loop gain, and the other filter is a higher frequency filter which minimizes the effect of statistical variations in the pseudo error count or correlation measurement.

The dither signal on lead 116 is also propagated down a second path 127 where it is multiplied by a constant "k" in multiplier 128. The output from multiplier 128 is delayed by two sample periods in a delay means 129 to arrive at a summing means 130 at the same time as the twice delayed and adjusted control signal from summer 124. Summing means 130 adds the two signals and provides the output signal from the control channel to the associated tap 71 or 72 in an associated one of adjusting means 15 or 19. It must be understood that when a dither signal is added to a control signal during a particular program cycle, it does not affect the control voltage until the beginning of the next program cycle. The feedback signal, which results from that dither signal, is, therefore, not available until the end of the second program cycle, and is not processed by the control algorithm until the third program cycle. The correction for this two-cycle delay is, therefore, built into the control algorithm.

A switching means 131, under the control of processor 112, is provided at the output of the control channels 117 associated with the optional recursive taps 72 in an associated one of adjusting means 15 or 19 for the following reason. In the acquisition mode, using only the measured correlations from detector means 13 and/or 17, the recursive taps in adjusting means 15 or 19 should be set to zero when present, thus setting the recursive equalizer to unity gain. This is achieved by processor means 112 positioning switch 131 to apply a ground at each of the recursive taps 72. This is necessary because a recursive equalizer is capable of oscillating, which, if it were to occur, would cause a reduction in the measured correlations. Since the dither algorithm is attempting to reduce the measured correlation, it will drive the recursive equalizer further into oscillation, which is undesirable.

What is claimed is:
1. A cross-polarization canceler comprising:
 a first and a second rail (10, 11) capable of propagating a first and a second signal, respectively, between a respective first and second input terminal and a first and second output terminal, each of said first and second signals including a first and second orthogonally polarized signal, respectively, and a cross-polarized component of the respective second and first orthogonally polarized signal;
 a first and a second cross-over path interconnecting the first and second rail and the second and first rail, respectively;
 a noise-blanking limiter (12 or 16) disposed to receive a signal propagating in the first rail at a point after the interconnections of the first and second cross-over paths for discriminating between the first orthogonally-polarized signal and the cross-polarized component of the second orthogonally-polarized signal;
 a first correlation detector means (13 or 17) responsive to the output signal of the noise-blanking limiter and the signal propagating on the second rail for providing an output signal representative of the correlation measurement between each of the two signals;

a second correlation detector means (17 or 13) responsive to the first and second signals propagating on the first and second rail for providing a correlation measurement between the two signals; and processing means (15, 19, 57, 115) disposed in the first and second cross-over paths and responsive to the correlation measurements from the first and second correlation means for providing a separate output signal in the first and second cross-over path which when combined with the signal propagating in the second and first rail, respectively, will substantially reduce any cross-polarization component forming part of the first and second signals.

2. A cross-polarization canceler according to claim 1 wherein the canceler further comprises:

a second noise-blanking limiter (16 or 12) disposed between the second rail and the second correlation detector means to receive the signal propagating on the second rail and generating an appropriate output signal to the second correlation detector means representative of a discrimination between the second orthogonally-polarized signal and a cross-polarized component of the first orthogonally-polarized signal.

3. A cross-polarization canceler according to claim 1 or 2 wherein each of the noise-blanking limiters comprises:

a first operational amplifier including a first and a second input terminal and an output terminal, the first operational amplifier being responsive to an input signal from the associated rail and a source of a first predetermined threshold level signal for providing a comparison of said two signals at the output terminal;

a second operational amplifier including a first and a second input terminal and an output terminal, the second operational amplifier being responsive to the input signal from the associated rail and a source of a second predetermined threshold level signal which is different than said first predetermined threshold level signal for providing a comparison of said two signals at the output terminal; and an OR gate including (a) a first and second input terminal connected to the output terminal of the first and second operational amplifiers, respectively, and (b) an output terminal connected to the associated correlation detector means.

4. A cross-polarization canceler according to claim 1 or 2 where each of the first and second correlation detector means is capable of providing a separate correlation measurement at one or more offsets in time.

5. A cross-polarization canceler according to claim 4 wherein the processing means comprises:

a processor (57) responsive to the output signals from each of the first and second correlation detector means for generating a first and second control signal indicating a level of the cross-polarized component of the second and first orthogonally polarized signal propagating in the first and second rail, respectively; and a first and a second signal adjusting means (15, 19) disposed in the first and second cross-over paths, respectively, the first and second adjusting means being responsive to the first and second control signals, respectively, from the processor for adjusting the phase and amplitude of the signal propagating in the respective first and second cross-over paths.

6. A cross-polarization canceler according to claim 5 wherein the processor comprises;

a memory for temporarily storing in separate locations of said memory (a) each correlation detector means output signal and (b) a table including a separate control signal conversion for each of a possible plurality of different correlation detector means output signal values; and a microprocessor responsive to each correlation detector means output signal value stored in the memory for causing the memory to transmit a corresponding control signal from the table of control signal conversions to each of the first and second signal adjusting means.

7. A cross-polarization canceler according to claim 6 wherein the memory is further capable of storing at separate memory locations (c) first and second error counts received from a first and second remote receiver, respectively, where said receivers are connected to receive the respective first and second signals propagating on the respective first and second rail, and (d) a table including a separate error count control signal conversion for each of a possible plurality of error counts; and the microprocessor is further responsive to the stored first and second error counts and to each correlation detector means output signal value for using each of the first and second error counts for causing the memory to transmit a corresponding error count control signal to each of the first and second adjusting means when each of the stored first and second error counts are below a predetermined threshold value, and for causing the memory to transmit a corresponding correlation measurement control signal to each of the first and second adjusting means when either one of the stored first and second error counts are equal to or above the predetermined threshold value.

* * * * *